United States Patent
Fer et al.

(10) Patent No.: US 10,715,557 B2
(45) Date of Patent: *Jul. 14, 2020

(54) SYSTEMS AND METHODS FOR CONDUCTING SECURE VOIP MULTI-PARTY CALLS

(71) Applicant: NAGRAVISION S.A., Cheseaux-sur-Lausanne (CH)

(72) Inventors: Francois Fer, Domloup (CH); Marco Macchetti, Cheseaux (CH); Laurent Gauteron, Evian (FR); Jerome Perrine, Romanel sur Morges (CH)

(73) Assignee: NAGRAVISION S.A., Cheseaux-sur-Lausanne (CH)

( * ) Notice: Subject to any disclaimer, the term of this patent is extended or adjusted under 35 U.S.C. 154(b) by 0 days.

This patent is subject to a terminal disclaimer.

(21) Appl. No.: 16/130,828

(22) Filed: Sep. 13, 2018

(65) Prior Publication Data

US 2019/0028518 A1 Jan. 24, 2019

Related U.S. Application Data

(63) Continuation of application No. 14/726,108, filed on May 29, 2015, now Pat. No. 10,122,767.

(51) Int. Cl.
*H04L 29/06* (2006.01)
*H04M 7/00* (2006.01)
(Continued)

(52) U.S. Cl.
CPC .......... *H04L 65/1006* (2013.01); *G06F 16/22* (2019.01); *H04L 63/06* (2013.01);
(Continued)

(58) Field of Classification Search
None
See application file for complete search history.

(56) References Cited

U.S. PATENT DOCUMENTS

| 5,128,996 A | 7/1992 | Rosenow |
| 5,150,410 A | 9/1992 | Bertrand |

(Continued)

FOREIGN PATENT DOCUMENTS

| CN | 1585539 | 2/2005 |
| CN | 1283063 | 11/2006 |

(Continued)

OTHER PUBLICATIONS

Chang et al., "How to converse securely in a conference", 30th Annual International Carnahan Conference on Security Technology (pp. 42-45), ISBN (Paper): 0-7803-3537-6, 1996.*

(Continued)

*Primary Examiner* — Piotr Poltorak
(74) *Attorney, Agent, or Firm* — Oblon, McClelland, Maier & Neustadt, L.L.P.

(57) ABSTRACT

System and method for establishing secure conference calls. In one example system, a central conference call server establishes point-to-point connections with accessory devices comprising a secure element and connected to corresponding participant devices. The conference call server includes an interface to a plurality of secure elements configured to perform scrambling and unscrambling of media signals communicated to and from the accessory devices. In another example, one of the participant devices operates as the central conference call server. In other examples, participant devices communicate on a conference call via point-to-point connections between all accessory devices connected to the participant devices. The accessory devices include secure elements for decryption and encryption of media signals communicated between the accessory devices.

20 Claims, 4 Drawing Sheets

(51) Int. Cl.
  *H04W 12/04*     (2009.01)
  *G06F 16/22*     (2019.01)
  *H04W 12/08*     (2009.01)
  *H04W 12/00*     (2009.01)

(52) U.S. Cl.
  CPC .......... *H04L 63/065* (2013.01); *H04L 65/403* (2013.01); *H04L 65/605* (2013.01); *H04M 7/006* (2013.01); *H04W 12/04* (2013.01); *H04W 12/00502* (2019.01); *H04W 12/08* (2013.01)

(56) References Cited

U.S. PATENT DOCUMENTS

| | | |
|---|---|---|
| 5,535,276 A | 7/1996 | Ganesan |
| 5,818,738 A | 10/1998 | Effing |
| 5,825,878 A | 10/1998 | Takahashi |
| 6,373,946 B1 | 4/2002 | Johnston |
| 6,742,116 B1 | 5/2004 | Matsui |
| 6,965,992 B1 | 11/2005 | Joseph |
| 7,024,393 B1 | 4/2006 | Peinado |
| 7,133,521 B2 | 11/2006 | Jabri |
| 7,149,896 B1 | 12/2006 | Bahl |
| 7,167,897 B2 | 1/2007 | Riddle |
| 7,310,730 B1 | 12/2007 | Champagne |
| 7,350,070 B2 | 3/2008 | Smathers |
| 7,558,529 B2 | 7/2009 | Seshadri |
| 7,627,289 B2 | 12/2009 | Huddart |
| 7,680,273 B2 | 3/2010 | Whitehead |
| 7,734,802 B1 | 6/2010 | Gay |
| 7,869,594 B2 | 1/2011 | Tsurumoto |
| 8,078,787 B2 | 12/2011 | Lydon |
| 8,103,210 B2 | 1/2012 | Tamura |
| 8,200,959 B2 | 6/2012 | Wing |
| 8,228,861 B1 | 7/2012 | Nix |
| 8,379,921 B1 | 2/2013 | Golan |
| 8,477,661 B2 | 7/2013 | Saleem |
| 8,738,916 B2 | 5/2014 | Klassen |
| 8,761,184 B1 | 6/2014 | Ho |
| 8,862,129 B2 | 10/2014 | Moshir |
| 9,369,445 B2 | 6/2016 | Mahajan |
| 9,480,096 B1 | 10/2016 | Lee |
| 9,569,638 B2 | 2/2017 | Zatko |
| 2002/0002683 A1 | 1/2002 | Benson |
| 2002/0009180 A1 | 1/2002 | Weirich |
| 2002/0058515 A1 | 5/2002 | Holler |
| 2002/0093948 A1 | 7/2002 | Dertz |
| 2002/0098878 A1 | 7/2002 | Mooney |
| 2002/0122401 A1 | 9/2002 | Xiang |
| 2003/0018705 A1 | 1/2003 | Chen |
| 2003/0046539 A1 | 3/2003 | Negawa |
| 2003/0059005 A1 | 3/2003 | Meyerson |
| 2003/0088618 A1 | 5/2003 | Sueyoshi |
| 2003/0235308 A1 | 12/2003 | Boynton |
| 2004/0109409 A1 | 6/2004 | Simpson |
| 2004/0230799 A1* | 11/2004 | Davis ................ H04L 9/0643 713/169 |
| 2004/0246332 A1* | 12/2004 | Crouch ............. H04L 12/1822 348/14.08 |
| 2005/0073575 A1 | 4/2005 | Thacher |
| 2005/0154793 A1 | 7/2005 | Khartabil |
| 2005/0154973 A1 | 7/2005 | Otsuka |
| 2005/0198379 A1 | 9/2005 | Panasyuk |
| 2005/0198380 A1 | 9/2005 | Panasyuk |
| 2005/0273510 A1 | 12/2005 | Schuh |
| 2006/0050883 A1 | 3/2006 | Walker |
| 2006/0101288 A1* | 5/2006 | Smeets ................ G06F 21/602 713/194 |
| 2006/0165060 A1 | 7/2006 | Dua |
| 2006/0198520 A1 | 9/2006 | Courtney |
| 2007/0018334 A1 | 1/2007 | Peytavy |
| 2007/0047711 A1 | 3/2007 | Florkey |
| 2007/0263798 A1 | 11/2007 | Dewing |
| 2007/0294346 A1* | 12/2007 | Moore ................ H04L 63/065 709/204 |
| 2008/0010674 A1* | 1/2008 | Lee ........................ G06F 21/32 726/7 |
| 2008/0034421 A1 | 2/2008 | Ahn |
| 2008/0037447 A1 | 2/2008 | Garg |
| 2008/0046731 A1 | 2/2008 | Wu |
| 2008/0130894 A1* | 6/2008 | Qj ....................... H04L 63/0485 380/277 |
| 2008/0146290 A1 | 6/2008 | Sreeram |
| 2008/0165707 A1 | 7/2008 | Baird |
| 2008/0171579 A1 | 7/2008 | Grubek |
| 2008/0263363 A1 | 10/2008 | Jueneman |
| 2008/0320190 A1 | 12/2008 | Lydon |
| 2009/0097628 A1 | 4/2009 | Yap |
| 2009/0147958 A1 | 6/2009 | Calcaterra |
| 2009/0150668 A1 | 6/2009 | Liu |
| 2009/0168978 A1 | 7/2009 | Laws |
| 2009/0296932 A1 | 12/2009 | Pilavic |
| 2010/0217982 A1 | 8/2010 | Brown |
| 2010/0293462 A1 | 11/2010 | Bull |
| 2011/0028136 A1 | 2/2011 | Frazier |
| 2011/0047383 A1 | 2/2011 | Klassen |
| 2011/0150216 A1 | 6/2011 | Barry |
| 2011/0251899 A1 | 10/2011 | Proulx |
| 2012/0005475 A1 | 1/2012 | Inagaki |
| 2012/0083208 A1 | 4/2012 | Giles |
| 2012/0198531 A1 | 8/2012 | Ort |
| 2012/0204029 A1 | 8/2012 | Trabucco |
| 2012/0252531 A1 | 10/2012 | King |
| 2012/0257750 A1 | 10/2012 | Bohm |
| 2012/0258726 A1 | 10/2012 | Bansal |
| 2012/0291095 A1 | 11/2012 | Narendra |
| 2013/0018975 A1 | 1/2013 | Higgins |
| 2013/0170361 A1 | 7/2013 | Manyakin |
| 2013/0252583 A1 | 9/2013 | Brown |
| 2013/0273889 A1 | 10/2013 | Lobmaier |
| 2013/0336161 A1 | 12/2013 | Jung |
| 2013/0339754 A1 | 12/2013 | Takashima |
| 2014/0033279 A1 | 1/2014 | Nimashakavi |
| 2014/0033280 A1 | 1/2014 | Nimashakavi |
| 2014/0280982 A1 | 9/2014 | Patel |
| 2014/0301249 A1 | 10/2014 | Moss |
| 2014/0366105 A1 | 12/2014 | Bradley |
| 2015/0031288 A1 | 1/2015 | Tubbesing |
| 2015/0059251 A1 | 3/2015 | Rinner |
| 2015/0089569 A1 | 3/2015 | Sondhi |
| 2015/0222601 A1 | 8/2015 | Metz |
| 2015/0237019 A1 | 8/2015 | Rohloff |
| 2015/0319684 A1 | 11/2015 | Okamoto |
| 2015/0365400 A1 | 12/2015 | Cox |
| 2016/0014579 A1 | 1/2016 | Kasilya Sudarsan |
| 2016/0028696 A1 | 1/2016 | Howe |
| 2016/0044030 A1* | 2/2016 | Galwas ............... H04L 63/0869 380/262 |
| 2016/0085566 A1 | 3/2016 | Benzaia |
| 2016/0088476 A1 | 3/2016 | Park |
| 2016/0234356 A1 | 8/2016 | Thomas |
| 2016/0234366 A1 | 8/2016 | De Filippis |

FOREIGN PATENT DOCUMENTS

| | | |
|---|---|---|
| CN | 101340433 | 7/2009 |
| EP | 1863301 | 2/2010 |
| EP | 2175580 | 4/2010 |
| EP | 2262143 | 12/2010 |
| GB | 2388279 | 11/2003 |
| GB | 2420251 | 5/2006 |
| WO | 2008129546 | 10/2008 |
| WO | 2012024903 | 3/2012 |
| WO | 2013121275 | 8/2013 |

OTHER PUBLICATIONS

Zongkai et al., "An Identity-Based Fault-Tolerant Conference Key Distribution Scheme", Seventh International Conference on Parallel and Distributed Computing, Applications and Technologies (PDCAT'06) (pp. 389-392), ISBN (Paper): 0-7695-2736-1, 2006.*

(56) References Cited

OTHER PUBLICATIONS

Office Action dated Dec. 4, 2018 in Australian Patent Application No. 2016269641.
Chumchu, P., et al., "A simple and Cheap End-to-End Voice Encryption Framework over GSM-based networks", Computing, Communications and Applications Conference (Comcomap), 2012, IEEE, Jan. 11, 2012, XPO32117819, DOI: 10.1109/COMCOMAP.2012.6154800, ISBN: 978-1-4577-1717-8.
Notification of Transmittal of the International Search Report and the Written Opinion of the International Searching Authority, or the Declaration, for PCT/EP2016/062375, dated Sep. 8, 2016, 12 pages.
Petersen, M., "Voice and Data Encryption Module for Attachment to Portable Cellular Telephone", Motorola Technical Developments, Motorola Inc., Schaumburg, IL, US, vol. 38, Jun. 1, 1991, pp. 32-34 XP000906022, ISSN: 0887-5286.
Menezes, et al., "Handbook of Applied Cryptography", 1997, ISBN: 0848385237.
International Search Report and Written Opinion for PCT/EP2016/061966 dated Aug. 19, 2016, 10 pages.
Lefebvre, R., Set Incoming Calls to Headset or Speaker on Your iPhone With iOS 7 Beata [iOS Tips]:, Jul. 2013, found on www.cultofmac.com.
Jabra Product Guide. 2009.
Notification of Transmittal of the International Search Report and The Written Opinion of the International Searching Authority, or the Declaration, for PCT/EP2016/061975, dated Jul. 1, 2016, 11 pages.
Menezes, et al. Handbook of Applied Cryptography, 1996, XP001525001.
International Search Report and Written Opinion for PCT/EP2016/062578 dated Aug. 4, 2016, 8 pages.
Reference Manual and operating Instructions Nagra Seven. Nagra. Mar. 2014.
CN 105025404. Google English Translation. Apr. 21, 2014.
CN 101227279 v. Google English Translation. Jul. 23, 2008.

\* cited by examiner

SYSTEMS AND METHODS FOR CONDUCTING SECURE VOIP MULTI-PARTY CALLS

CROSS REFERENCE TO RELATED APPLICATIONS

The present application is a Continuation of U.S. application Ser. No. 14/726,108, filed May 29, 2015, entitled, "SYSTEMS AND METHOD FOR CONDUCTING SECURE VOIP MULTI-PARTY CALLS," which is hereby incorporated herein in its entirety.

BACKGROUND

People communicate wirelessly and on the go. Among the devices that make this possible are those sometimes referred to as personal mobile devices. Examples of personal mobile devices include cell phones, smartphones, walkie-talkies, and portable hotspots, among others. A personal mobile device could be handheld (as may be the case for a walkie-talkie), body-mounted, or attached to a vehicle (such as the roof of a car), as examples.

Given the relative ease with which radio signals can be intercepted, communication with (or between) personal mobile devices is often encrypted to prevent interception of the communication by third parties. Encryption is the process of converting audible voice or other data into unintelligible voice, while decryption is the process of converting the unintelligible voice back to the original audible voice. The respective algorithms used for encryption and decryption are often referred to collectively as a cipher. Examples of common ciphers include Advanced Encryption Standard (AES), Blowfish, Triple Data Encryption Algorithm (3DES), and RC4, among numerous others.

Encryption and authentication of callers and/or voice or data being communicated have increased the security, privacy and confidentiality of parties communicating between personal mobile devices involved in point-to-point communications. With respect to multi-party calls such as conference calls, particularly over a Voice-over-Internet Protocol ("VOIP") infrastructure, gaps remain in the infrastructure where audio and call data remain unsecured. Callers often use accessory devices such as headsets when calling from a personal mobile device. While secure media sessions may be established between headset endpoints, connections to a conference call may involve exposing the voice and call data to untrusted components at the server's communication interface.

In view of the foregoing, there is an ongoing need for improving security, privacy and confidentiality of callers participating in conference calls, particularly on VOIP calls.

SUMMARY

In view of the above, methods are provided for a conference call server to host and maintain conference calls. According to an example of the method, the server receives an inbound communication from each of a plurality of participant devices in a conference call communication. Each of the plurality of participant devices comprises a connection to an accessory device having a secure element configured to scramble and unscramble audio signals using participant key information stored therein. The inbound communication comprises scrambled media signals communicated from the accessory device at a participant endpoint of a secure media session and relayed by the participant device. The scrambled media signals from each inbound communication are relayed to a cryptographic interface with a plurality of server secure elements. The server secure elements are configured to unscramble and scramble audio signals at a server side endpoint of the secure media session with a corresponding one of the plurality of accessory devices using server key information maintained by the server secure element and not accessible by the server. An audio signal is received from the cryptographic interface, where the audio signal is generated by each of the plurality of server secure elements from each scrambled media signal received in the media sessions with the plurality of participant devices. The plurality of audio signals is mixed to generate conference call data to be communicated to all users as a mixed audio signal. The mixed audio signal is provided to the cryptographic interface for each of the plurality of server secure elements to scramble the mixed audio signal and to generate a plurality of outbound scrambled media signals. Each outbound scrambled media signal is communicated as outbound communications to each of the plurality of participant devices.

In one embodiment of the method, the server may also receive a request to initiate a secure communication connection from each one of the plurality of participant devices. The server may then establish the secure media sessions between the accessory devices connected to each participant device and a corresponding one of the plurality of server secure elements in response to each request to initiate the secure connection. Secure media sessions may be established by relaying key information from each accessory device to each corresponding server secure element.

In establishing the secure media session in at least another embodiment of the method, each server secure element may perform a key exchange method. The key exchange method generates a server decryption key to unscramble the scrambled media portions from the corresponding accessory device and a server encryption key to scramble the mixed audio signal for unscrambling by the corresponding accessory device.

In at least one embodiment of the method, the key exchange method may be performed using the Diffie-Hellman key exchange method.

In another example implementation, a conference call server is provided. The conference call server comprises a communication interface configured to communicate over a data network with a plurality of participant devices. Each participant device is connected to an accessory device having audio input and output devices and a participant secure element for maintaining participant key information. The communication interface communicates scrambled audio signals with each accessory device on a corresponding secure media session relayed by the associated participant device. A cryptographic interface is connected to a plurality of server secure elements configured to scramble and unscramble audio signals communicated with the accessory devices connected to corresponding participant devices using server key information stored therein. An audio mixer mixes audio signals from incoming scrambled audio signals unscrambled by the server secure element corresponding to the accessory devices connected to the plurality of participant devices. The audio mixer mixes the audio signals to generate conference call data to be communicated to the users in the conference call as a mixed audio signal. The mixed audio signal is provided to the cryptographic interface. Each server secure element generates a scrambled audio signal to provide to the cryptographic interface to communicate via the communication interface to each participant device to relay to its associated accessory device.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

Various example embodiments are described herein with reference to the following drawings, in which like numerals denote like entities, and in which.

DETAILED DESCRIPTION

Figure 1:
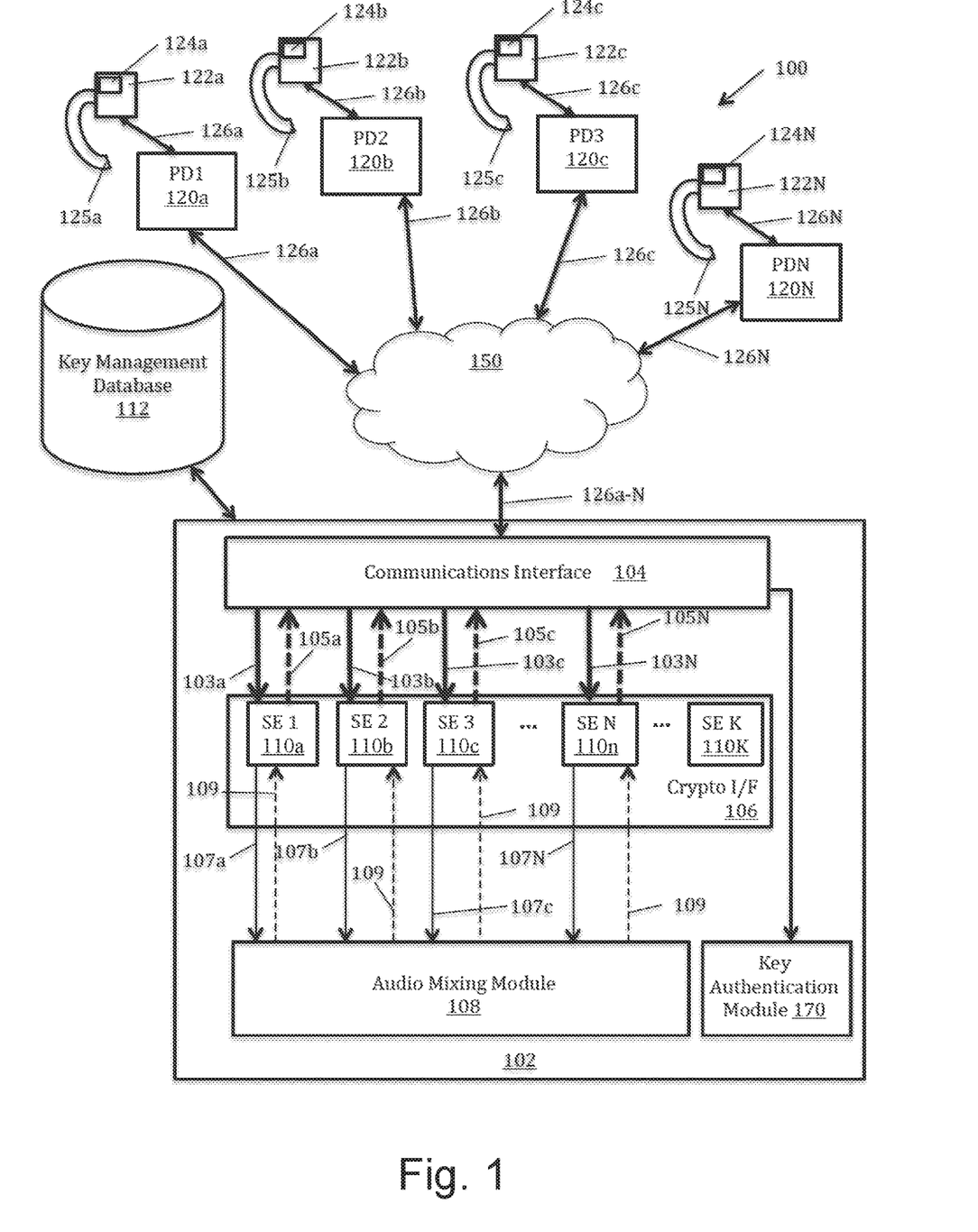
FIG. 1 is a schematic diagram of an example system for conducting a conference call using a central conference call server.

FIG. 1 is a schematic diagram of an example system 100 for conducting a conference call using a central conference call server 102. The conference call server 100 comprises a communication interface 104, a cryptographic interface 106, and an audio mixing module 108. The conference call server 102 is shown hosting a conference call for N participant devices 120a-n. The conference call is conducted on VOIP connections over a data network (i.e. the Internet 150. Each participant device 120a-n calls in to the conference call by establishing VOIP connections with the conference call server 102. The VOIP connections are established to be secure from endpoint to endpoint as described in the description of example implementations of the system 100. The communication interface 104 is configured to manage the VOIP connections with the participant devices 120a-n over the data network 150.

Each participant device 120a-n is connected to an accessory device 122a-n having an audio input 125a-n and an audio output device (not shown), and a participant secure element 124a-n for maintaining participant key information. The communication interface 104 communicates scrambled audio signals with each accessory device 122a-n on a corresponding secure media session 126a-n. At each participant device 120a-n, the corresponding secure media session 126a-n is relayed to the associated accessory device 122a-n so that participant secure element 124a-n in the accessory device 122a-n is one endpoint of the secure media session 126a-n. The participant secure element 124a-n in each accessory device 122a-n is configured to perform scrambling and unscrambling of the media portion of the corresponding secure media session 126a-n, which in a typical conference call will include at least audio signals, but may also include video in some embodiments.

The cryptographic interface 106 is connected to a plurality of server secure elements 110a-n each configured to scramble and unscramble audio signals communicated with the accessory devices 122a-n connected to corresponding participant devices 120a-n using server key information stored therein. The cryptographic interface 106 connects the communications over the secure media sessions 126a-n by relaying the scrambled audio signals on the secure media sessions 126a-n to and from the server secure elements 110a-n so that the server secure elements 110a-n comprise the server-side endpoint for the plurality of secure media sessions 126a-n. As shown in FIG. 1, the first secure media session 126a connects the first participant secure element 124a in the first accessory device 122a as one endpoint to the first participant device 120a. The first participant device 120a relays the first secure media session 126a to the Internet 150 and to the communications interface 104 of the conference call server 102. The conference call server 102 relays the first secure media session 126a to the first server secure element 110a. The second through $n^{th}$ media sessions 126b-n are established in a similar manner.

The server secure elements 110a-n are configured to perform all scrambling and unscrambling of media communicated with the conference call server 102 at the server-side endpoint of the secure media connections 126a-n. Each server secure element 110a-n may be configured with encryption and decryption modules and at least one processor to perform encryption and decryption functions. Each server secure element 110a-n also stores server key information generated during initiation of the media sessions that is used in performing the encryption and decryption of the media signals. In some examples of the system 100, the server secure elements 110a-n perform all security processing associated with the media signals and store all security information used to perform such processing. No encryption information used by the server secure elements 110a-n is accessible to the conference call server 102.

As shown in FIG. 1, each server secure element 110a-n receives incoming scrambled audio signals 103a-n. The corresponding server secure elements 110a-n unscrambles the incoming scrambled audio signals 103a-n to generate unscrambled audio signals 107a-n. The audio mixer 108 receives the unscrambled audio signals 107a-n and mixes the audio signals generated from the incoming scrambled audio signals 103a-n that were unscrambled by the server secure elements 110a-n corresponding to the accessory devices 122a-n to generate a mixed audio signal 109 to provide to the cryptographic interface 106.

The cryptographic interface 106 generates a scrambled mixed audio signal 105a-n provided by each corresponding server secure element 110a-n to communicate via the communication interface 104 to each participant device 120a-n to relay to its associated accessory device 122a-n. The cryptographic interface 106 in FIG. 1 includes an interface to k server secure elements 110a-k. As described in more detail below, point-to-point connections are created with the server secure elements 110a-n. The conference call server 102 can then handle a conference call with up to N=K callers.

In some example embodiments, the cryptographic interface 106 includes a hardware interface to the plurality of server secure elements 110a-n also implemented as a plurality of hardware secure modules. The plurality of hardware secure modules may be implemented, for example, as a plurality of micro SD cards, each configured as a secure element with the described encryption/decryption functions and information stored therein. The hardware interface to the plurality of server secure elements may be any one of a smart card interface, universal serial bus ("USB"), ball grid array ("BGA") interface, a surface mount device ("SMD") interface, printed circuit board interface, or similar data connection.

In an example embodiment, each secure media session may be established to operate as secure Real-Time Protocol ("RTP") sessions during initiation using the Session Initiation Protocol ("SIP"). The SIP-based initiation of the secure media sessions may also include Transport Layer Security ("TLS") for added protection during the SIP handshaking.

As noted above, each server secure element 110a-n stores the server key information, which may include a server encryption key and a server decryption key. The server encryption key and the server decryption key may be generated using a key exchange method performed during initiation of the scrambled media session 126a-n using key information received from the participant secure element 124a-n in the accessory device 122a-n connected in the corresponding media session 126a-n with the server secure element 110a-n. The server decryption key is used to unscramble the scrambled audio signals from the corresponding accessory device and the server encryption key is used to scramble the mixed audio signal for unscrambling by the corresponding accessory device.

In example implementations, audio signals are communicated in VOIP as RTP packets comprising a header and a packet payload. The packet payload may be encrypted and decrypted using an advanced encryption standard (AES) algorithm, or any other suitable ciphering and deciphering algorithm. The key information in each secure element may also include a session key for authenticating each packet before ciphering or deciphering.

In one example implementation, the key exchange method is performed according to ZRTP. In other example implementations, the key exchange method may use the elliptical curve Diffie Hellman (ECDH) key exchange method. Other protocols for key exchange include the Brainpool elliptical curve ("brainpoolP256r1" and "brainpoolP384r1").

In an example embodiment, the conference call server 102 may include a participant device authentication module 170 to authenticate a global participant key provided by the participant device 120a-n during initiation of a secure connection to the conference call server 102. The global participant key may be any suitably implemented authentication mechanism or information to generate an authentication mechanism that validates the participant device's participation in a specific conference call session. For example, the participant device authentication module 170 may validate the global participant key itself to authenticate the user of the presenting participant device. If the participating device 120a-n presents no global participation key, or one that is invalid for a given conference call, the user is denied access to the conference call. The participant device authentication module 170 may also validate the date and time of the conference call where global participant keys are issued with such criteria. If the user presents a global participant key that is not valid for the date and time of the conference call, the user will be denied access. The users of the participant devices 120a-n may obtain a necessary global participant key for a designated conference call in a registration step with the conference call server 102. During the registration, the conference call server 102 may access a key management database 112 to obtain global participant keys to issue to users.

In an example embodiment, the participant device authentication module 170 may validate a segment key provided by the participant device 120a-n during initiation of the secure connection to the conference call server 102. The segment key may be configured to be indicative of a group identity of the user of the participant device thereby providing access to the users according to the user's membership or belonging to a group or groups of users for which the conference call is intended. The key management database 112 may be configured to maintain the segment keys having a value indicative of a group identity, and may be configured to provide the segment key to the participant devices during a registration process.

It is noted that the accessory devices 122a-n may include any suitable devices having audio input and output capabilities, such as headsets, which are illustrated in FIGS. 1-4. Suitable devices may include AN devices capable of interfacing with the participant devices, or an audio box configured similar to a headset, but without the structure to maintain the device on the user's head.

The participant devices 120a-n may include smartphones, walkie-talkies, and portable hotspots, among others having VOIP capabilities. The participant devices 120a-n may also include laptops, desktop computers, or any other computing device having at least a minimal user interface.

Figure 2:
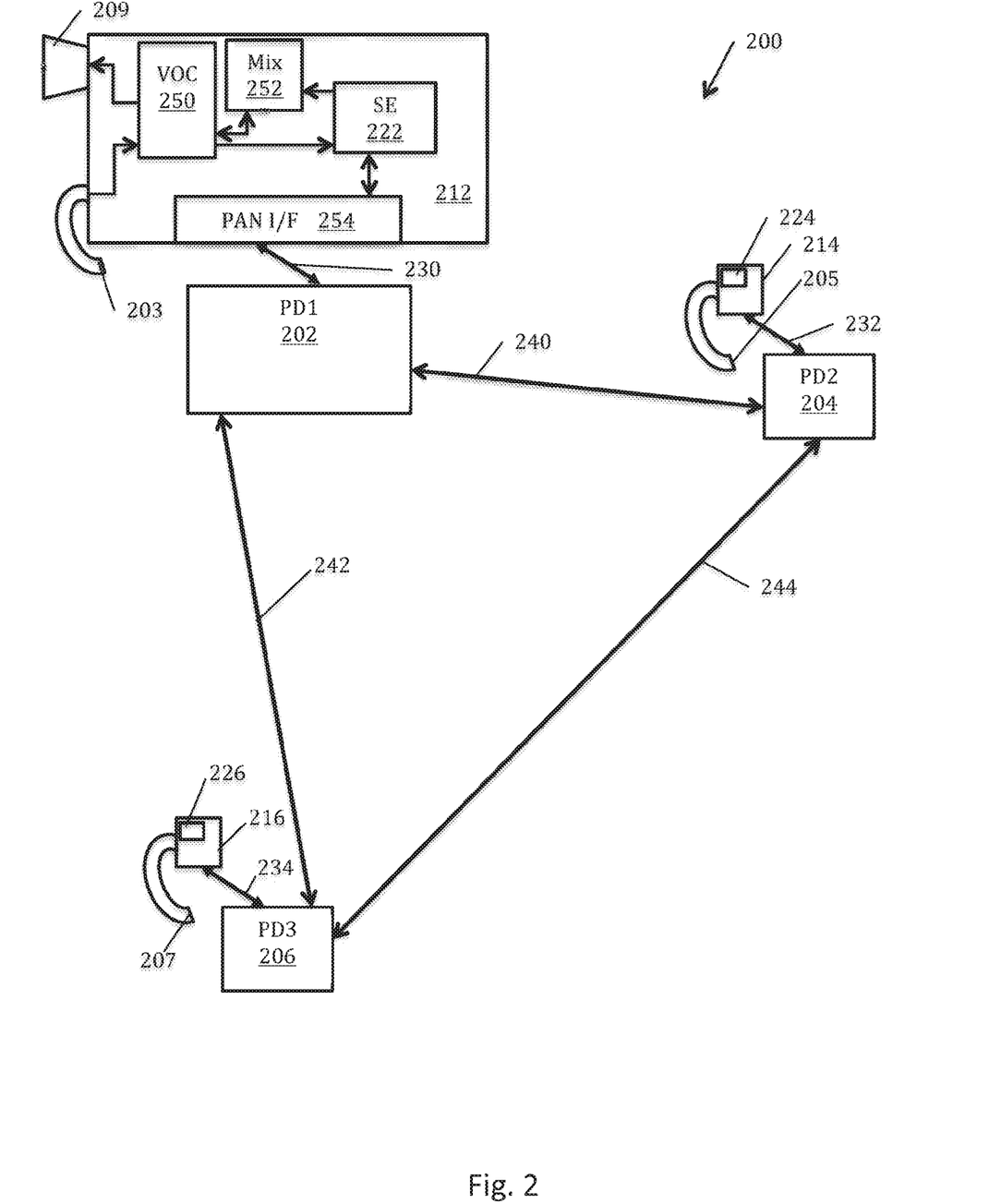
FIG. 2 is a schematic diagram of an example of a system for conducting a conference call among a plurality of participant devices.

FIG. 2 is a schematic diagram of an example of a system 200 for conducting a conference call among a plurality of participant devices 202, 204, 206. The plurality of participant devices 202, 204, 206 are each connected to an associated accessory device 212, 214, 216. Each accessory device 212, 214, 216 includes a participant secure element 222, 224, 226, an audio input 203, 205, 207 and a data network interface. Each participant secure element 222, 224, 226 maintains key information not accessible to the associated participant device 202, 204, 206, and each participant secure element 222, 224, 226 is configured to perform scrambling and unscrambling of the media signals (audio and/or video) communicated during the conference call. The data network interface in each accessory device 212, 214, 216 is configured to maintain a secure media session with each of the other accessory devices 212, 214, 216.

A first one 212 one of the accessory devices 212, 214, 216 comprises an audio vocoder 250 configured to receive an analog audio input signal from an audio input 203. The vocoder 250 converts the analog signal to a digital audio input signal. The vocoder 250 may be implemented according to G.723 or G.729, or may be a simple analog-to-digital ("ADC")/digital-to-analog ("D/A") converter. The vocoder 250 may also perform compression/decompression and other suitable functions known in the art. The secure element 222 of the first accessory device 212 is connected to the audio vocoder 250 and generates, using at least two distinct encryption keys, at least two respective streams of outbound encrypted voice packets based on the digital audio input signal. The first accessory device 212 includes a personal area network (PAN) wireless interface 254 connected to the secure element 222. The PAN wireless interface 254 communicates the at least two respective streams of outbound encrypted voice packets to the first participant communication device 202, and receives from the first participant communication device 202 at least two inbound encrypted voice packet streams.

The secure element 222 decrypts the at least two inbound encrypted voice packet streams to provide two inbound voice packet streams to the vocoder 254. The at least two inbound voice packet streams are communicated to an audio signal mixer 252 to combine the two inbound voice packet streams into a mixed audio analog signal. The mixed audio signal is communicated to the vocoder 254, which converts the mixed audio signal to an analog audio signal to be communicated to an audio output device 209 so that the analog audio signal may be heard by the user of the first accessory device 222.

In a conference call using the system 200 in FIG. 2, a first media session 240 is established between the first participant device 202 and the second participant device 204, where the first media session 240 connects to the first participant secure element 222 over a first accessory connection 230 between the first participant device 202 and the first accessory device 212. The first media session 240 also connects to the second participant secure element 224 over a second accessory connection 232 between the second participant device 204 and the second accessory device 214. A second media session 242 is established between the first participant device 202 and the third participant device 206, where the second media session 242 connects to the first participant secure element 222 over the first accessory connection 230. The second media session 242 also connects to the third participant secure element 226 over a third accessory connection 234 between the third participant device 206 and the third accessory device 216. A third media session 244 is established between the second participant device 204 and the third participant device 206, where the third media session 244 connects to the second participant secure element 224 over the second accessory connection 232. The third media session 244 also connects to the third participant secure element 226 over the third accessory connection 234. Encrypted voice packet streams are communicated between the secure elements 222, 224, 226 on the accessory devices 212, 214, 216 over the first media session 240, the second media session 242, and the third media session 244 during a conference call between the participant devices 202, 204, 206.

Each of the participant devices 202, 204, 206 includes a conference call processor configured to initiate the secure media sessions 240, 242, 244. The participant devices 202, 204, 206 are also configured to communicate the encrypted voice packet streams to and from the associated accessory device 212, 214, 216.

Each participant secure element 222, 224, 226 comprises a decryption module configured to decrypt, using the key information in the participant secure element, each encrypted voice packet stream received from each of the other accessory devices to generate a corresponding incoming voice packet stream. The participant secure elements 222, 224, 226 also include an encryption module to generate encrypted voice packet streams by encrypting, using the key information in the participant secure element connected to the accessory device, the audio input signal received at the audio input 203, 205, 207. The encrypted voice packet streams are communicated for decryption by the participant secure element in each accessory device that is to receive a corresponding one of the encrypted voice packet streams. Note that in this embodiment, each participant device receives a plurality of encrypted sessions and after decrypting each session, forms a mixed audio signal for playback via the audio output of the accessory device.

It is noted that each participant secure element 222, 224, 226 includes key information, which comprises a plurality of encryption keys. Each encryption key is generated for encrypting voice packet streams to be sent to a corresponding one of the other accessory devices in the conference call session. The key information also includes a plurality of decryption keys. Each decryption key is generated for decrypting voice packet streams received from a corresponding one of the other accessory devices in the conference call session. Each participant secure element 222, 224, 226 maintains key information and performs encryption/decryption functions for the multiple secure media sessions that each participant secure element 222, 224, 226 maintains with each other participant secure element 222, 224, 226. Depending on the performance capability of the secure elements, the number of participant devices that may be able to participate in a conference call may be limited.

Each participant secure element 222, 224, 226 generates key information during initialization of the secure media sessions 240, 242, 244. For example, the key information may be generated as a result of a key exchange method performed during initialization of the media sessions 240, 242, 244. For example, during initiation of the first media session 240, a key exchange method may be performed to generate key information at the first participant secure element 222 and the second participant secure element 224. The key information at the first participant secure element 222 may include a first encryption key and a first decryption key for encrypting and decrypting, respectively, the audio signals communicated with the second participant secure element 224. During initiation of the second media session 242, a key exchange method may be performed to generate key information at the first participant secure element 222 and the third participant secure element 226. In addition to the first encryption key and the first decryption key described above, the key information at the first participant secure element 222 may also include a second encryption key and a second decryption key for encrypting and decrypting the audio signals communicated with the third participant secure element 226. The key exchange methods performed during the initiation of the first and second media sessions 240, 242 would generate encryption and decryption keys in the key information stored in the second and third participant secure elements 224, 226. The key information in each participant secure element 222, 224, 226 would then include a set of encryption/decryption keys corresponding to each secure media session 240, 242, 244 connecting all of the participant secure elements 222, 224, 226 with one another.

In an example implementation, the key exchange method performed is an elliptical curve Diffie-Hellman key exchange method. The zRTP protocol may also be used. It is noted that operation of the secure elements in the system in FIG. 2 may be similar to the operation of the server secure elements 110a-n described above with reference to FIG. 1.

Figure 3:
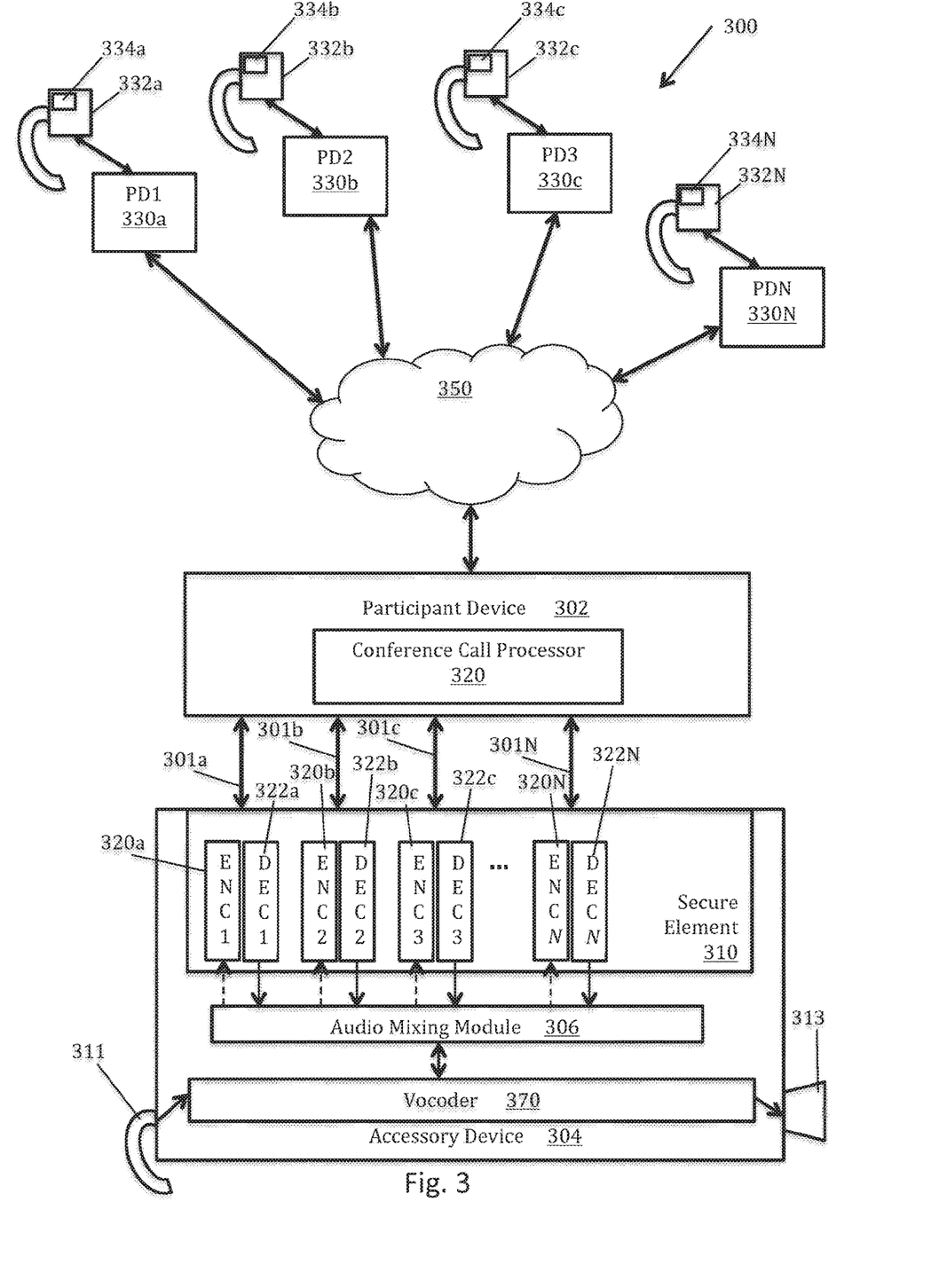
FIG. 3 is a schematic diagram of an example system for conducting a conference call where one of the participating devices operates as the conference call server.

FIG. 3 is a schematic diagram of an example system 300 for conducting a conference call where one of the participating devices operates as the conference call server. The system 300 includes a communications device 302, which is a participant device configured to operate as the conference call server. The communications device is configured to form a data network connections with each of a plurality of participant devices 330a-n in a conference call session having N participants. Each of the plurality of participant devices 330a-n is connected to a corresponding accessory device 332a-n, which includes a corresponding participant secure element 334a-n.

The communications device 302 includes a server accessory device 304, which includes a server secure element 310 with key information stored therein, an audio input 311, an audio output 313 (i.e. a speaker), and a vocoder 370. The vocoder 370 may be any suitable vocoder of the type described above with reference to FIG. 2. The key information in the server secure element 310 is used to establish a plurality of secure media sessions corresponding to each accessory device 332a-n associated with each participant device 330a-n in the conference call session. Scrambled audio signals are communicated over the plurality of secure media sessions as scrambled or encrypted voice packet streams.

The server secure element 310 includes an encryption module for storing encryption keys 320a-n corresponding with secure media sessions 301a-n with the participant secure elements 334a-334n in each participant accessory device 332a-n. The encryption module is also configured to perform encryption on audio signals to be communicated to the participant accessory devices 332a-n. The server secure element 310 also includes a decryption module for storing decryption keys 322a-n corresponding with secure media sessions 301a-n with the participant secure elements 334a-n in each participant accessory device 332a-n. The decryption module is also configured to perform decryption on audio signals received from the participant accessory devices 332a-n.

The server accessory device 304 receives an audio signal from the user at the audio input 311 in analog form to be digitized by the vocoder 370. The audio mixer 306 mixes the digital audio signal from the audio input 311 and the incoming audio signals generated after decryption of incoming scrambled audio signals by the server secure element 310. The audio mixer generates the mixed audio signal for encryption by the server secure element 310.

The communications device 302 includes a conference call processor 320 configured to initiate the plurality of secure media sessions between the server accessory device 304 and each of the plurality of accessory devices 332a-n associated with each of the participant devices 330a-n. The conference call processor 320 relays incoming scrambled audio signals to the server accessory device 304, and the plurality of scrambled mixed audio signals over the secure media sessions with the plurality of participant devices 330a-n.

In an example implementation, the conference call processor 320 is configured to relay key generation information to the server accessory device 304 for delivery to the server secure element 310. The key generation information is used by the server secure element 310 to generate the key information stored in the server secure element 310. In an example implementation, the key information includes the plurality of encryption keys 320a-n, each encryption key generated for scrambling audio signals to be sent to a corresponding one of the other accessory devices 334a-n.

The key information stored in the server secure element 310 also includes the plurality of decryption keys 322a-n. Each decryption key is generated for unscrambling scrambled audio signals received from a corresponding one of the other accessory devices 332a-n associated with the plurality of participant devices 330a-n in the conference call session.

Each of the plurality of encryption keys and each of the plurality of decryption keys corresponding to each of the other accessory devices is generated with a key exchange method using the key generation information. The key exchange method may be performed during initiation of the secure media session with each of the other accessory devices 332a-n. In an example implementation, the key exchange method performed is an elliptical curve Diffie-Hellman key exchange method. The zRTP protocol may also be used. It is noted that operation of the secure elements in the system in FIG. 2 may be similar to the operation of the server secure elements 110a-n described above with reference to FIG. 1.

It is noted that in the system 300 in FIG. 3, the secure element 310 in the accessory device 304 is in point-to-point communication with each of the plurality of participant devices 330a-n. The number of connections, K, that can be established for a conference call may be limited by performance limitations of the component used for the secure element 310.

Figure 4:
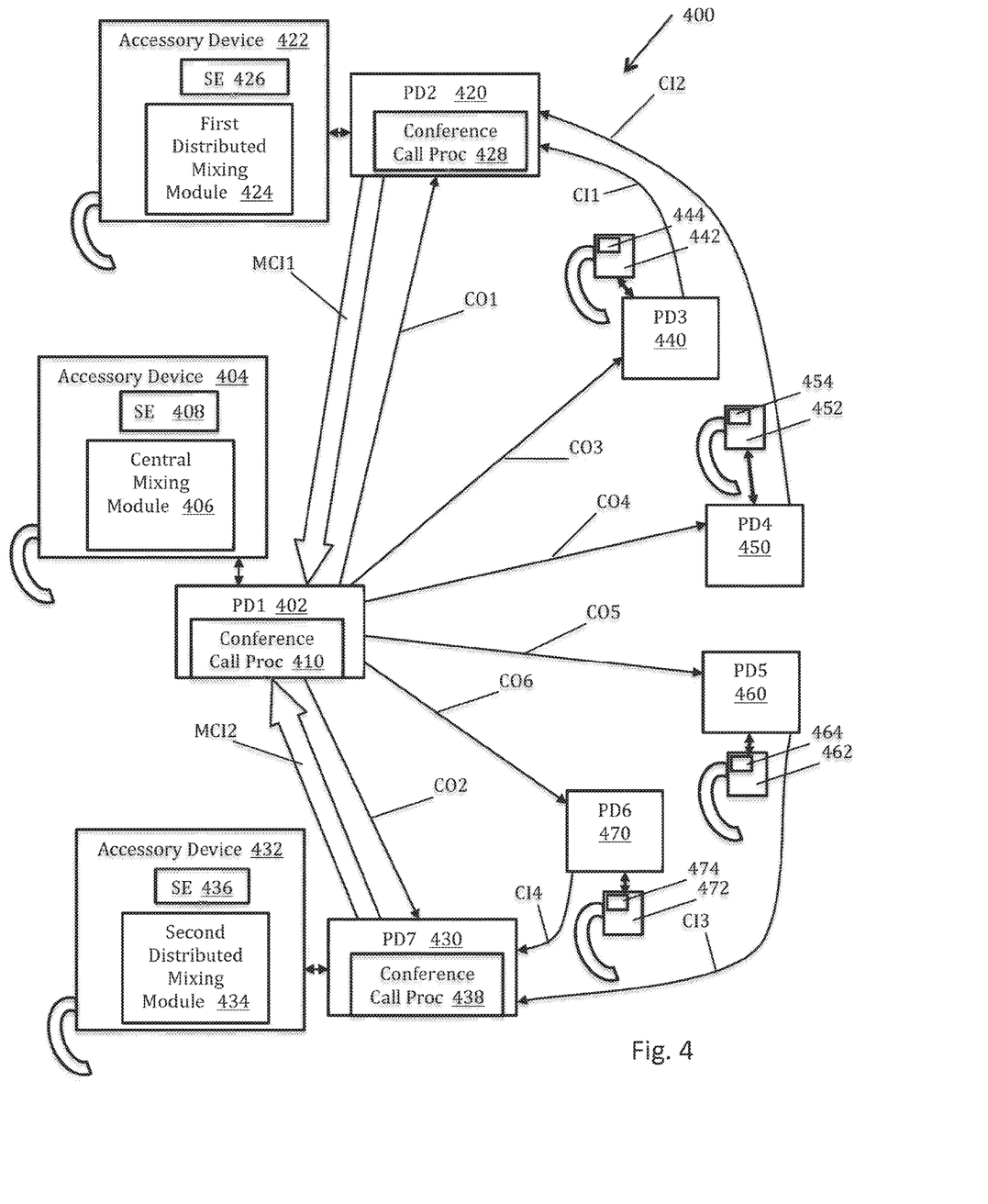
FIG. 4 is a schematic diagram of an example of a system for conducting a conference call among a plurality of participant devices where conference call functions are distributed among the participant devices.

FIG. 4 is a schematic diagram of an example of a system 400 for conducting a conference call among a plurality of participant devices where conference call functions are distributed among the participant devices. The system comprises a central participant device 402 connected to a central accessory device 404 having a central mixing module 406 and a central secure element 408.

The system 400 also includes a first intermediary participant device 420 and a second intermediary participant device 430. The first intermediary participant device 420 and the second intermediary participant device 430 are each connected to a corresponding first and second intermediary accessory devices 422 and 432. The first intermediary accessory device 422 and the second intermediary accessory device 432 each comprises a corresponding first and second intermediary secure element 426 and 436.

In a conference call, each of the first and second intermediary accessory devices 422, 432 is connected to the central accessory device via corresponding first and second secure media sessions. The first secure media session connects the central accessory device 404 and the first intermediary accessory device 420 to communicate central outbound mixed audio signals CO1 as encrypted voice packet streams from the central accessory device 404, and to communicate first intermediary inbound mixed audio signals MCI1 as encrypted voice packet streams from the first intermediary accessory device 420 to the central accessory device 404. The actual endpoints of the first secure media session are the central secure element 408 and the first intermediary secure element 426 to permit the central secure element 408 and the first intermediary secure element 426 to encrypt/decrypt the audio signals communicated on the first media session.

In a conference call, the second secure media session connects the central accessory device 404 and the second intermediary accessory device 430 to communicate central outbound mixed audio signals CO2 as encrypted voice packet streams from the central accessory device 404, and to communicate second intermediary inbound mixed audio signals MCI2 as encrypted voice packet streams from the second intermediary accessory device 430 to the central accessory device 404. The actual endpoints of the second secure media session are the central secure element 408 and the second intermediary secure element 436 to permit the central secure element 408 and the second intermediary secure element 436 to encrypt/decrypt the audio signals communicated on the second media session.

The system 400 also includes a first distributed participant device 440, a second distributed participant device 450, a third distributed participant device 460 and a fourth distributed participant device 470. The first distributed participant device 440 includes a first distributed accessory device 442 having a first distributed secure element 444. The first distributed secure element 444 forms a central inbound media session with the first intermediary secure element 422 to communicate audio as encrypted voice packet streams from the user of the first distributed participant device 460 as central inbound audio signals CI1. The first distributed secure element 444 forms a central outbound media session with the central secure element 408 to receive central outbound audio signals CO3 as encrypted voice packet streams from the central accessory device 404.

The second distributed participant device 450 includes a second distributed accessory device 452 having a second distributed secure element 454. The second distributed secure element 454 forms a central inbound media session with the first intermediary secure element 422 to communicate scrambled audio from the user of the second distributed participant device 450 as central inbound audio CI2 as encrypted voice packet streams. The second distributed secure element 454 forms a central outbound media session with the central secure element 408 to receive scrambled central outbound audio signals CO4 as encrypted voice packet streams from the central accessory device 404.

The first intermediary accessory device 422 receives the audio signals from the first and second distributed accessory devices 440, 450 after the first intermediary secure element 426 has unscrambled the audio signals. The first intermediary accessory device 422 includes a first distributed mixing module 424 to mix the audio signals received from the first and second distributed accessory devices 440, 450, and with an audio signal input from the user of the first intermediary accessory device 420. The first intermediary secure element 426 scrambles the mixed audio signal from the first distributed mixing module 424 and communicates the scrambled mixed audio signal as the first intermediary inbound mixed audio signals MCI1 described above.

The third distributed participant device 460 includes a third distributed accessory device 462 having a third distributed secure element 464. The third distributed secure element 464 forms a central inbound media session with the second intermediary secure element 432 to communicate scrambled audio from the user of the third distributed participant device 460 as central inbound audio CI3. The third distributed secure element 464 forms a central outbound media session with the central secure element 408 to receive scrambled central outbound audio signals CO5 from the central accessory device 404.

The fourth distributed participant device 470 includes a fourth distributed accessory device 472 having a fourth distributed secure element 474. The fourth distributed secure element 474 forms a central inbound media session with the second intermediary secure element 432 to communicate scrambled audio from the user of the fourth distributed participant device 470 as central inbound audio CI4. The fourth distributed secure element 474 forms a central outbound media session with the central secure element 408 to receive scrambled central outbound audio signals CO6 from the central accessory device 404.

The second intermediary accessory device 432 receives the audio signals from the third and fourth distributed accessory devices 460, 470 after the second intermediary secure element 436 has unscrambled the audio signals. The second intermediary accessory device 432 includes a second distributed mixing module 434 to mix the audio signals received from the first and second distributed accessory devices 460, 470, and with an audio signal input from the user of the second intermediary accessory device 430. The second intermediary secure element 436 scrambles the mixed audio signal from the second distributed mixing module 434 and communicates the scrambled mixed audio signal as the second intermediary inbound mixed audio signals MCI2 described above.

The inbound mixed audio signals MCI1 and MCI2 received at the central secure element 408 are decrypted to generate audio signals from the corresponding intermediary accessory devices 424, 434. The inbound mixed audio signal MCI1 represents incoming audio from the first distributed participant device 440, the second distributed participant device 450, and the first intermediary accessory device 422. The inbound mixed audio signal MCI2 represents incoming audio from the third distributed participant device 460, the fourth distributed participant device 470, and the second intermediary accessory device 432. The central accessory device 404 receives the signals MCI1 and MCI2 and mixes the signals using the central mixing module 406 to generate a composite mixed audio signal. The central secure element 408 encrypts the composite mixed audio signal and communicates the scrambled composite mixed audio signal on central outbound communications CO1, CO2, CO3, CO4, CO5, and CO6 described above.

In view of the above, examples of implementations of secure conference call systems and methods include:

1. A Method for Performing a Conference Call Controlled by a Central Conference Call Server.

The server receives an inbound communication from each of a plurality of participant devices in a conference call communication. Each of the plurality of participant devices comprises a connection to an accessory device having a secure element configured to scramble and unscramble audio signals using participant key information stored therein. The inbound communication comprises scrambled media signals communicated from the accessory device at a participant endpoint of a secure media session and relayed by the participant device. The scrambled media signals from each inbound communication are relayed to a cryptographic interface with a plurality of server secure elements. The server secure elements are configured to unscramble and scramble audio signals at a server side endpoint of the secure media session with a corresponding one of the plurality of accessory devices using server key information maintained by the server secure element and not accessible by the server. An audio signal is received from the cryptographic interface, where the audio signal is generated by each of the plurality of server secure elements from each scrambled media signal received in the media sessions with the plurality of participant devices. The plurality of audio signals are mixed to generate conference call data to be communicated to all users as a mixed audio signal. The mixed audio signal is provided to the cryptographic interface for each of the plurality of server secure elements to scramble the mixed audio signal and to generate a plurality of outbound scrambled media signals. Each outbound scrambled media signal is communicated as outbound communications to each of the plurality of participant devices.

In the method for performing a conference call, the server may also receive a request to initiate a secure communication connection from each one of the plurality of participant devices. The server may then establish the secure media sessions between the accessory devices connected to each participant device and a corresponding one of the plurality of server secure elements in response to each request to initiate the secure connection. Secure media sessions may be established by relaying key information from each accessory device to each corresponding server secure element.

In establishing the secure media session in the method for performing a conference call, each server secure element performs a key exchange method. The key exchange method generates a server decryption key to unscramble the scrambled media portions from the corresponding accessory device and a server encryption key to scramble the mixed audio signal for unscrambling by the corresponding accessory device.

In the method for performing a conference call, the key exchange method may be performed using the Diffie-Hellman key exchange method.

In the method for performing a conference call, the server may receive a request to initiate a secure communication connection from each one of the plurality of participant devices. The request from each participant device may include a global key. The global key may be authenticated by determining if the global key is valid for use to participate in a conference call on a conference call server that received the request.

The method may further include authenticating the global key by determining if the global key is valid for a time and day on which the request is received.

The method may further include a registration process involving receiving a request for a global key from one of the participant devices for participation in conference call conducted using the conference call server. The global key is retrieved from a key management database and sent to the requesting participant device.

The method may further include receiving a request from each participant device to initiate a secure communication connection from each one of the plurality of participant devices where the request includes a segment key indicative of a group to which the user of the participant device belongs. The segment key may be authenticated by determining if the segment key is valid for use to participate in a conference call on a conference call server that received the request.

The method may further include a registration process in which a request for a segment key is received from one of the participant devices corresponding to a group, which the user of the participant device belongs. The segment key is retrieved from a key management database and communicated to the requesting participant device.

2. A Conference Call Server.

The conference call server comprises a communication interface configured to communicate over a data network with a plurality of participant devices. Each participant device is connected to an accessory device having audio input and output devices and a participant secure element for maintaining participant key information. The communication interface communicates scrambled audio signals with each accessory device on a corresponding secure media session relayed by the associated participant device. A cryptographic interface is connected to a plurality of server secure elements configured to scramble and unscramble audio signals communicated with the accessory devices connected to corresponding participant devices using server key information stored therein. An audio mixer mixes audio signals from incoming scrambled audio signals unscrambled by the server secure element corresponding to the accessory devices connected to the plurality of participant devices. The audio mixer mixes the audio signals to generate conference call data to be communicated to the users in the conference call as a mixed audio signal. The mixed audio signal is provided to the cryptographic interface. Each server secure element generates a scrambled audio signal to provide to the cryptographic interface to communicate via the communication interface to each participant device to relay to its associated accessory device.

The cryptographic interface in the conference call server may include a hardware interface to the plurality of server secure elements. The plurality of server secure elements may be implemented as a plurality of hardware secure modules.

The plurality of hardware secure modules of the conference call server may comprise a plurality of microSD cards each configured as a secure element.

The hardware interface to the plurality of server secure elements may be selected from a group consisting of: smart card interface, ball grid array ("BGA") interface, a surface mount device ("SMD") interface, or a printed circuit board interface.

The plurality of secure elements may also be implemented as software interfaces with input/output components.

The server key information in each server secure element of the conference call server may include a server encryption key and a server decryption key. The server encryption key and the server decryption key may be generated using a key exchange method performed during initiation of the scrambled media session using key information received from the participant secure element in the accessory device connected in the media session with the server secure element. The server decryption key is used to unscramble the scrambled audio signals from the corresponding accessory device and the server encryption key is used to scramble the mixed audio signal for unscrambling by the corresponding accessory device. The key exchange method may be performed using the Diffie Hellman key exchange method.

The conference call server may also include a participant device authentication module to authenticate a global participant key provided by the participant device during initiation of a secure connection to the conference call server.

The participant device authentication module may be configured to validate a date and time associated with the global participant key and to deny authentication if the date and time is not valid for the global participant key.

The conference call server may include a participant device authentication module configured to validate a segment key provided by the participant device during initiation of the secure connection to the conference call server. The segment key may be indicative of a group identity of the user of the participant device.

The conference call server may include a key management database configured to maintain the global participant key and to provide the global participant key to one of the participant devices during a registration process performed by the participant device.

The key management database of the conference call server may further maintain a segment key having a value indicative of a group identity. The key management database may be configured to provide the segment key to one of the participant devices during the registration process.

3. Conference Calls Using Multi-Audio Stream

The conference call using multi-audio streams may be implemented as an apparatus comprising an audio vocoder configured to receive an analog audio input signal and provide a digital audio input signal. The apparatus includes at least one secure element connected to the audio vocoder and configured to generate, using at least two distinct encryption keys, at least two respective streams of outbound encrypted voice packets based on the digital audio input signal. A personal area network (PAN) wireless interface is connected to the at least one secure element. The PAN wireless interface is configured to communicate the at least two respective streams of outbound encrypted voice packets to a participant communication device and to receive from the participant communication device at least two inbound encrypted voice packet streams. The at least one secure element is further configured to decrypt the at least two inbound encrypted voice packet streams and to provide two inbound voice packet streams to the vocoder. An audio signal mixer combines the two inbound voice packet streams into a mixed audio analog signal.

The at least one secure element in the apparatus may further comprise at least two decryption keys to decrypt the at least two inbound encrypted voice packet streams. The at least two decryption keys and the at least two encryption keys may be generated using a key exchange method performed during initiation of the at least two inbound encrypted voice packet streams.

The apparatus may use the Diffie-Hellman key exchange method to perform the key exchange method. The Diffie-Hellman method generates encryption key information comprising the encryption keys and the decryption keys.

4. A Method for Conducting a Conference Call Using Multi-Audio Streams Between Participant Devices.

In a method using multi-audio streams between participant devices, at least two inbound encrypted voice packet streams are received at a personal area network (PAN) wireless interface of a first accessory device. The first accessory device includes a first secure element and is connected to a first participant device via the PAN wireless interface. The at least two inbound encrypted voice packet streams are received from at least two accessory devices each comprising a secure element, and each connected to at least two other participant devices. The inbound encrypted voice packet streams are communicated to the first secure element for decrypting of the inbound encrypted voice packet streams using at least two decryption keys stored therein. Decryption generates at least two inbound voice packet streams. A digital input audio signal is received from a vocoder connected to receive analog audio signals from an audio input on the first accessory device. The at least two voice packet streams are mixed to generate a mixed audio signal. The mixed audio signal is communicated to the vocoder to generate an analog mixed audio signal for output to an audio output on the first accessory device. The digital input audio signal is communicated to the first secure element to encrypt the digital input audio signal using at least two encryption keys stored therein to generate at least two outbound encrypted voice packet streams. The at least two outbound encrypted voice packet streams are communicated to the first participant device via the PAN wireless interface to communicate to the at least two other participant devices.

The method may further comprise receiving at the first accessory device a request to initiate a secure media session for communicating inbound and outbound encrypted voice packet streams with each of the at least two accessory devices connected to the associated at least two participant devices. The secure media sessions with each of the at least two accessory devices are established in response to each request to initiate the secure media sessions by communicating key information received from each accessory device to the first secure element.

In establishing the secure media sessions, the first secure element may perform a key exchange method with each secure element in each of the at least two accessory devices to generate at least two decryption keys to decrypt the inbound encrypted voice packet streams from each corresponding accessory device and at least two encryption keys to encrypt the digital audio input signal for decryption by the secure elements in the corresponding accessory device.

The key exchange method performed may be the Diffie-Hellman key exchange method.

5. Participant Device as Conference Call Server

A communications device may be configured to participate as a caller in a conference call and as a conference call server. In an example implementation, the communications device comprises a data network interface to form a data network connection with each of a plurality of participant devices in a conference call session. A server accessory device having a server secure element with key information stored therein is included to establish a plurality of secure media sessions corresponding to each accessory device associated with each participant device in the conference call session. The server secure element decrypts each scrambled audio signal received in each secure media session to generate a corresponding incoming audio signal from each accessory device associated with each participant device. The server secure element encrypts a mixed audio signal using the key information to generate a corresponding plurality of scrambled mixed audio signals for communication to the accessory devices over the corresponding secure media sessions. An audio input is connected to the server accessory device to receive an audio signal. An audio mixer mixes the audio signal from the audio input and the incoming audio signals from each secure incoming scrambled audio signal to generate the mixed audio signal.

The communications device may include a conference call processor to initiate the plurality of secure media sessions between the server accessory device and each of the plurality of accessory devices associated with each of the participant devices. The conference call processor relays incoming scrambled audio signals to the server accessory device and the plurality of scrambled mixed audio signals over the secure media sessions with the plurality of participant devices.

The conference call processor may also be configured to relay key generation information to the server accessory device for delivery to the server secure element. The key generation information is used by the server secure element to generate the key information stored in the server secure element. The key information comprises a plurality of encryption keys, each encryption key generated for scrambling audio signals to be sent to a corresponding one of the other accessory devices associated with the plurality of participant devices in the conference call session, and a plurality of decryption keys, each decryption key generated for unscrambling scrambled audio signals received from a corresponding one of the other accessory devices associated with the plurality of participant devices in the conference call session. Each of the plurality of encryption keys and each of the plurality of decryption keys corresponding to each of the other accessory devices is generated with a key exchange method using the key generation information. The key exchange method is performed during initiation of the secure media session with each of the other accessory devices.

The key exchange method may be the Diffie-Hellman key exchange method, which generates encryption key information comprising the encryption keys and the decryption keys.

6. A Method for Performing a Conference Call Hosted by a Communications Device Participating in the Conference Call.

In a method involving a conference call hosted by a participant device, the communications device is connected to a server accessory device comprising a server secure element. The communications device receives an inbound communication from each of a plurality of participant devices in the conference call. Each of the plurality of participant devices comprises a connection to a participant accessory device having a participant secure element. The inbound communication comprises scrambled media signals communicated from the accessory devices at participant endpoints of a plurality of secure media sessions. The scrambled media signals from each inbound communication are relayed to the server secure element. The server secure element is configured to unscramble and scramble audio signals at a server side endpoint of the plurality of secure media sessions using server key information maintained by the server secure element. A plurality of audio signals is received from the cryptographic interface, where each of the plurality of audio signals is generated by the server secure element. Each audio signal corresponds to one of the scrambled media signals received in the media sessions with the plurality of accessory devices. The plurality of audio signals are mixed to generate a mixed audio signal. The mixed audio signal is provided to the cryptographic interface for the server secure element to scramble the mixed audio signal to generate a plurality of scrambled audio signals. Each of the plurality of scrambled audio signals is communicated as outbound communications to each of the plurality of accessory devices.

The method further comprises receiving a request to initiate a secure communication connection from each one of the plurality of participant devices. In response to each request, the plurality of secure media sessions are established between the server accessory device and each of the plurality of accessory devices by relaying key generation information corresponding to each accessory device to the server secure element.

The method may further comprise, in the step of establishing the secure media sessions, performing a key exchange method using the key generation information to generate a plurality of decryption keys to unscramble the scrambled audio signals from each corresponding accessory device and a plurality of encryption keys to scramble the mixed audio signal for unscrambling by the secure element in the corresponding accessory device.

The key exchange method may be performed using the Diffie-Hellman key exchange method.

7. Distributed Conference Call Functions

Conference calls may be conducted such that functions are distributed among the participant devices. An apparatus of a participant device comprises an audio vocoder configured to receive an analog audio input signal and provide a digital audio input signal. A secure element is connected to the audio vocoder and configured to generate, using an encryption key corresponding to a first accessory device connected to a corresponding first participant device, a stream of outbound encrypted voice packets comprising the digital audio input signal. A personal area network (PAN) wireless interface is connected to the secure element. The PAN wireless interface communicates the stream of outbound encrypted voice packets to a participant communication device for communication to the first accessory device, and receives from the participant communication device an inbound encrypted voice packet stream communicated from a second accessory device. The secure element is further configured to decrypt the inbound encrypted voice packet stream using a decryption key corresponding to the second accessory device and to provide an inbound voice packet stream to the vocoder for audio output.

In the apparatus, the decryption key may be generated using a key exchange method performed during initiation of the inbound encrypted voice packet stream with the first accessory device. The encryption key is generated using a key exchange method performed during initiation of the outbound encrypted voice packet stream with the second accessory device.

The key exchange method may be the Diffie-Hellman key exchange method.

The apparatus may be configured to operate as a distributed accessory device in a distributed function teleconferencing system. In the distributed function teleconferencing system, the distributed accessory device communicates the outbound voice packet stream to a first intermediary accessory device configured to mix audio streams from at least the distributed accessory device and a digital audio input connected to the intermediary accessory device. The distributed accessory device receives the inbound voice packet stream from a central accessory device configured to mix audio streams from the first intermediary accessory device, a second intermediary accessory device, and a digital audio input connected to the central accessory device.

The apparatus may be configured to operate as an intermediary accessory device in a distributed function teleconferencing system. In the distributed function teleconferencing system, the intermediary accessory device receives the incoming encrypted voice packet stream as a first incoming encrypted voice packet stream from a first distributed accessory device and a second incoming encrypted voice packet stream from a second distributed accessory device. The intermediary accessory device communicates the outbound voice packet stream to a central accessory device configured to mix the audio stream from the outbound voice packet stream, an audio stream from at least one other intermediary accessory device, and a digital audio input connected to the central accessory device. The decryption key in the secure element is a first distinct decryption key corresponding to the first incoming encrypted voice packet stream from the first distributed accessory device to generate a first incoming voice packet stream. The secure element is configured to decrypt the second incoming encrypted voice stream using a second distinct decryption key corresponding to communications with the second distributed accessory device to generate a second incoming voice packet stream. The intermediary accessory device further comprises a distributed mixing module configured to mix the first incoming voice packet stream, the second incoming voice packet stream and the digital input signal to generate a mixed audio signal. The secure element generates the stream of outbound encrypted voice packets from the mixed audio signal.

The apparatus may be configured to operate as a central accessory device in a distributed function teleconferencing system. In the distributed function teleconferencing system, the central accessory device communicates the outbound encrypted voice packet stream as a first outbound encrypted voice packet stream to a first intermediary accessory device. The central accessory device is configured to communicate a second outbound encrypted voice packet stream to a second intermediary accessory device and a plurality of distributed outbound encrypted voice packet streams to a plurality of distributed accessory devices. The central accessory device receives the incoming encrypted voice packet stream as a first incoming encrypted voice packet stream from a first intermediary accessory device, and a second incoming encrypted voice packet stream from a second intermediary accessory device. The decryption key in the secure element is a first distinct decryption key corresponding to the first incoming encrypted voice packet stream from the first intermediary accessory device used to generate a first incoming voice packet stream. The encryption key in the secure element is a first distinct encryption key corresponding to the first outbound encrypted voice packet stream to the first intermediary device. The secure element is configured to decrypt the second incoming encrypted voice stream using a second distinct decryption key corresponding to communications with the second intermediary accessory device to generate a second incoming voice packet stream, to encrypt the outbound voice packet stream using a second distinct encryption key corresponding to communications to the second intermediary accessory device, and to encrypt the outbound voice packet stream using a plurality of distinct encryption keys corresponding to communications to the plurality of distributed accessory devices. The central accessory device further comprises a central mixing module configured to mix the first incoming voice packet stream, the second incoming voice packet stream and the digital input signal to generate a mixed audio signal. The secure element generates the stream of outbound encrypted voice packets from the mixed audio signal.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A method comprising:
   receiving, by a conference-call server, a plurality of data packets sent from each of a plurality of remote endpoints, each of the plurality of data packets being in a conference-call session;
   relaying each of the received data packets over a physical-connection port to a respective secure hardware element of a plurality of secure hardware elements associated with the conference-call server;
   establishing respective cryptographic relationships between each of the plurality of respective secure hardware elements and each of the plurality of respective remote endpoints at least in part by negotiating, using the each of the plurality of respective secure hardware elements, respective endpoint-specific cryptographic key information for the conference call session with the each of the plurality of respective remote endpoints;
   decrypting an encrypted packet payload of each relayed data packet;
   mixing decrypted audio from each decrypted packet payload to generate unencrypted mixed audio;
   encrypting the unencrypted mixed audio; and
   outputting the encrypted mixed audio for transmission to the respective remote endpoint.

2. The method of claim 1, further comprising:
   receiving, by the conference-call server, a secure communication connection initiation request from each remote endpoint of the plurality of remote endpoints, wherein establishing the respective cryptographic relationships includes relaying key information from the respective remote endpoint to the corresponding secure hardware element of the plurality of secure hardware elements and is in response to receiving the respective secure communication connection initiation request.

3. The method of claim 2, wherein establishing the respective cryptographic relationships comprises performing a key exchange to generate, for each secure hardware element of the plurality of secure hardware elements, a server decryption key for decrypting the encrypted packet payload and a server encryption key for encrypting the mixed audio.

4. The method of claim 3, wherein performing the respective key exchange comprises a Diffie-Hellman key exchange.

5. The method of claim 1, further comprising:
   receiving a global key from each remote endpoint of the plurality of remote endpoints; and
   authenticating the global key at least in part by determining whether the global key is valid for use to participate in the conference-call session.

6. The method of claim 5, wherein authenticating the global key further comprises determining whether the global key is valid for a time and day on which a request for the global key is received.

7. The method of claim 5, further comprising:
   receiving, at the conference-call server, a request for the global key from one of the remote endpoints for participation in the conference-call session;
   retrieving the global key from a key-management database; and
   sending the global key to the requesting remote endpoint.

8. The method of claim 1, further comprising:
   receiving a segment key indicative of a group to which a user of the corresponding remote endpoint belongs; and
   authenticating the corresponding segment key by determining whether the corresponding segment key is valid for use to participate in the conference-call session.

9. The method of claim 1, further comprising:
   receiving a segment-key request for a segment key from one of the remote endpoints corresponding to a group to which a user of at least one other remote endpoint belongs;
   retrieving the segment key from a key-management database; and
   sending the segment key to the requesting remote endpoint.

10. A conference-call server comprising:
    a communication interface configured to communicate, during a conference-call session, a plurality of data packets to a plurality of remote endpoints of the conference-call session;
    a cryptographic interface coupled to the communication interface, the cryptographic interface comprising a plurality of individual physical-connection ports, each connected to a secure hardware element of a plurality of secure hardware elements associated with the conference-call server, the cryptographic interface configured to receive the respective data packets sent from the respective remote endpoints and to relay the respective data packets to the respective secure hardware elements;
    each secure hardware element configured to:
       establish respective cryptographic relationships between each of the plurality of respective secure hardware elements and the respective remote endpoint at least in part by negotiating, using the each of the plurality of respective secure hardware elements, respective endpoint-specific cryptographic key information for the conference call session with the each of the plurality of respective remote endpoints; and
       decrypt an encrypted packet payload of each relayed data packet; and
    an audio mixer configured to mix decrypted audio from each decrypted packet payload to generate unencrypted mixed audio,
    wherein each secure hardware element is further configured to encrypt the unencrypted mixed audio, and
    wherein the cryptographic interface is further configured to output the encrypted mixed audio for transmission to the respective remote endpoint.

11. The conference-call server of claim 10, wherein the respective secure hardware elements of the plurality of secure hardware elements comprise respective microSD cards.

12. The conference-call server of claim 10, wherein the cryptographic interface is a hardware interface to the plurality of secure hardware elements selected from the group consisting of: a smart card interface, a ball grid array ("BGA") interface, a surface mount device ("SMD") interface, and a printed circuit board ("PCB") interface.

13. The conference-call server of claim 10, wherein the cryptographic key information of each secure hardware element of the plurality of secure hardware elements comprises a server encryption key and a server decryption key, each respective key being generated using a key-exchange performed during establishment of the respective cryptographic relationship using key information received from the respective remote endpoint, wherein the server decryption key is used to decrypt the encrypted packet payload and the server encryption key is used to encrypt the mixed audio.

14. The conference-call server of claim 13, wherein the respective key-exchanges comprise Diffie-Hellman key-exchanges.

15. The conference-call server of claim 10, further comprising a remote-endpoint-authentication module configured to authenticate a global key provided by a given remote endpoint of the plurality of remote endpoints during initiation of secure media session with the conference-call server.

16. The conference-call server of claim 15, wherein the remote-endpoint-authentication module is further configured to validate a date and time associated with the global key.

17. The conference-call server of claim 15, wherein the remote-endpoint-authentication module is further configured to validate a segment key provided by a given remote endpoint in the plurality of remote endpoints during initiation of the corresponding secure media session with the conference-call server, the segment key being indicative of a group identity of a user of the given remote endpoint.

18. The conference-call server of claim 15, further comprising a key-management database configured to maintain the global key and to provide the global key to requesting remote endpoints during respective registration processes.

19. The conference-call server of claim 18, wherein the key-management database is further configured to:
  maintain a segment key having a value indicative of a group identity; and
  provide the segment key to at least one of the remote endpoints during the respective registration process.

20. The method of claim 1, wherein each of the respective cryptographic relationships is associated with security parameters that (i) include the cryptographic key information, and (2) are inaccessible to a communication interface.

* * * * *